US012770174B2

(12) United States Patent
Xie et al.

(10) Patent No.: US 12,770,174 B2
(45) Date of Patent: Oct. 20, 2026

(54) SEARCH RELEVANCE MODEL USING SELF-ADVERSARIAL NEGATIVE SAMPLING

(71) Applicant: Maplebear Inc., San Francisco, CA (US)

(72) Inventors: Yuqing Xie, Toronto (CA); Taesik Na, Seattle, WA (US); Saurav Manchanda, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 349 days.

(21) Appl. No.: 18/107,854

(22) Filed: Feb. 9, 2023

(65) Prior Publication Data

US 2023/0252549 A1 Aug. 10, 2023

Related U.S. Application Data

(60) Provisional application No. 63/308,385, filed on Feb. 9, 2022.

(51) Int. Cl.
*G06Q 30/0601* (2023.01)
*G06Q 30/0201* (2023.01)

(52) U.S. Cl.
CPC ..... *G06Q 30/0631* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 11,972,424 | B1 * | 4/2024 | Grudetskyi | G06F 40/284 |
| 2020/0065903 | A1 | 2/2020 | Rembert | |
| 2020/0104746 | A1 * | 4/2020 | Strope | G06F 16/35 |
| 2020/0226418 | A1 | 7/2020 | Dorai-Raj et al. | |
| 2020/0321116 | A1 * | 10/2020 | Neumann | G16H 50/00 |

(Continued)

OTHER PUBLICATIONS

Lakshman, Vihan, Teo, Choon Hui, Chu, Xiaowen, Nigam, Priyanka, Patni, Abhinandan, Maknikar, Pooja, Vishwanathan; SVN ARXIV ID: 2110.06125; Publication Date: Oct. 12, 2021. (Year: 2021).*

(Continued)

*Primary Examiner* — Michelle T Kringen
(74) *Attorney, Agent, or Firm* — Fenwick & West LLP

(57) ABSTRACT

To train an embedding-based model to determine relevance between items and queries, an online system generates training data from previously received queries and interactions with results for the queries. The training data includes positive training examples including a query and an item with which a user performed a specific interaction after providing the query. To generate negative training examples for the query to include in the training data, the online system determines measures of similarity between items with which the specific interaction was not performed and the query. The online system may weight a loss function for the embedding-based model by the measure of similarity for a negative example, increasing the effect of a negative example including a query and an item with a larger measure of similarity. In other embodiments, the online system selects negative training examples based on the measures of similarities between items and queries in pairs.

20 Claims, 4 Drawing Sheets

(56) References Cited

U.S. PATENT DOCUMENTS

| | | | |
|---|---|---|---|
| 2021/0005304 | A1 | 1/2021 | Neumann |
| 2021/0241344 | A1 | 8/2021 | Mantha et al. |

OTHER PUBLICATIONS

Devlin, J. et al. "Bert: Pre-training of Deep Bidirectional Transformers for Language Understanding," *arXiv preprint arXiv:1810.04805*, Oct. 11, 2018, pp. 1-16.

PCT International Search Report and Written Opinion, PCT Application No. PCT/US2023/12715, May 3, 2023, 8 pages.

Xie, Y. et al. "An Embedding-Based Grocery Search Model at Instacart," *arXiv preprint arXiv:2209.05555*, Sep. 12, 2022, pp. 1-11.

* cited by examiner

SEARCH RELEVANCE MODEL USING SELF-ADVERSARIAL NEGATIVE SAMPLING

CROSS REFERENCE TO RELATED APPLICATION

This application claims the benefit of U.S. Provisional Application No. 63/308,385, filed Feb. 9, 2022, which is incorporated by reference herein in its entirety.

BACKGROUND

Online systems manage and provide various items (e.g., products) with which users of the online systems interact. Users may search items offered by an online system through queries including one or more terms to identify items of interest to the user. User interaction with an online system increases in frequency and in quality when the online system returns the most relevant items to a query to users for consideration as search results for the query. With relatively noisy or little to no human-labeled data for an online system to identify relevance of different items to different queries, it is challenging for existing models (which may, e.g., be used by online systems to identify items in response to a query) to be trained to accurately determine relevance between queries and items.

SUMMARY

In accordance with one or more aspects of the disclosure, an online system, such as an online concierge system, may determine a measure of relevance between queries and items. To determine the measure of relevance, the online system trains a model for determining relevance between a query and an item in online searches. In various embodiments, the online system uses self-adversarial negative sampling to generate negative samples for training the model to improve model performance. The online system may also use a combination of negative sample sharing and scaled loss for negative samples for improved computational and memory scalability when training the model.

In some embodiments, the model comprises multiple layers including a query encoder, an item encoder, and a fusion layer. The query encoder may be trained to generate query embeddings using queries (e.g., sentences or terms) as input. The item encoder may be trained to generate item embeddings using item attributes such as item name, brand, size, unit, category, description, etc. The fusion layer determines a measure of relevance between a query and an item based on the corresponding query embedding and the corresponding item embedding. In some embodiments, the model may learn a set of comprehensive embeddings from a combined set of data including both query data and item data, instead of using separate encoders for a query and for an item.

To train the model, the online system generates training data from previously received queries. The training data may include multiple training examples, with each training example including a pair of a query and an item. Additionally, a label is applied to each training example, with a label applied to a training example indicating whether a specific interaction was performed with the item after the online system received the query. For example, a label applied to a training example indicates whether a user included the item of the training example in an order after the online system received the query included in the training example. Other examples of specific interactions include storing the item and requesting additional information for the item. A training example with a label indicating that the specific interaction was performed may be referred to herein as a positive training example. Similarly, a training example with a label indicating that the specific interaction was not performed may be referred to herein as a negative training example. The online system trains the model using training examples including both positive training examples and negative training examples for various queries.

Negative training examples may be generated via multiple methods. For example, the online system may use an in-batch negative method that identifies a positive training example that includes a specific query and an item. The method also generates negative training examples, where each negative training example includes the specific query and an item selected from a positive training example that includes a different query. In some embodiments, the online system selects a subset of negative training examples generated through the in-batch negative method that reduces the number of negative training samples for training. In some embodiments, the sampled negative method may limit use of the sampled negative training examples to loss calculation for the model, which may achieve a more balanced weight between the positive and negative examples.

To select the subset of negative training examples, the online system may use uniform sampling or self-adversarial negative reweighting and sampling in various embodiments. For uniform sampling, the online system randomly selects a number of negative training examples from the negative training examples. Each negative training example has a same probability of being selected when universal sampling is performed. For self-adversarial negative reweighting, the online system may select negative training examples based on a measure of similarity between a query included in a negative training example and an item included in the negative training negative example. The measure of similarity may be a measure of relevance output by a current set of parameters comprising the model when applied to a negative training example or may be another measure of similarity (e.g., dot product, cosine similarity) calculated between an item and a query in the negative training example. When backpropagating an error term from application of the model to a negative training example through the model during training, the online system may apply a weight to the error term that is directly related to the measure of similarity between the item and the query in the negative training example. This allows the online concierge system to increase an amount by which negative training examples including a query and an item with higher measures of similarity affects parameters of the model. Hence, the online system may assign a higher weight to an error term for negative training examples including a query and an item with a higher measure of similarity to each other. For example, the online system weights an error term for a negative sample by the measure of similarity (e.g., cosine similarity or another method of similarity measurement) between the item and the query of the negative example. Additionally or alternatively, for self-adversarial negative sampling, the subset of negative training examples may be selected based on a probability distribution that is related to a measure of similarity between an item and a query included in various negative training examples.

In addition, the online system may leverage negative-sample sharing for the training data, where the negative-sample sharing groups queries in the training dataset are into sets having a specific size, with each set of queries using a common group of negative training examples. In some embodiments, for a query in a set, items included in positive training examples for other queries in the set are used as negative training examples for the query. Hence, rather than independently sampling a number of negative training examples for each query, the online system groups queries into sets and determines a group of negative training examples for a query of a set based on positive training examples for other queries in the set. The set of negative training examples is shared across queries of the set. Negative-sample sharing may provide one or more technical advantages. For example, negative-sample sharing may reduce the total number of negative training examples, increasing computational efficiency. Negative-sample sharing may further reduce computational cost by leveraging matrix-to-matrix multiplication as queries are grouped into sub-groups. Further, without an overly large number of negative training samples, accuracy of the model is improved by avoiding issues with training using a large number of negative examples, such as generalization due to diversity in a large set of negative training examples.

DETAILED DESCRIPTION

Figure 1:
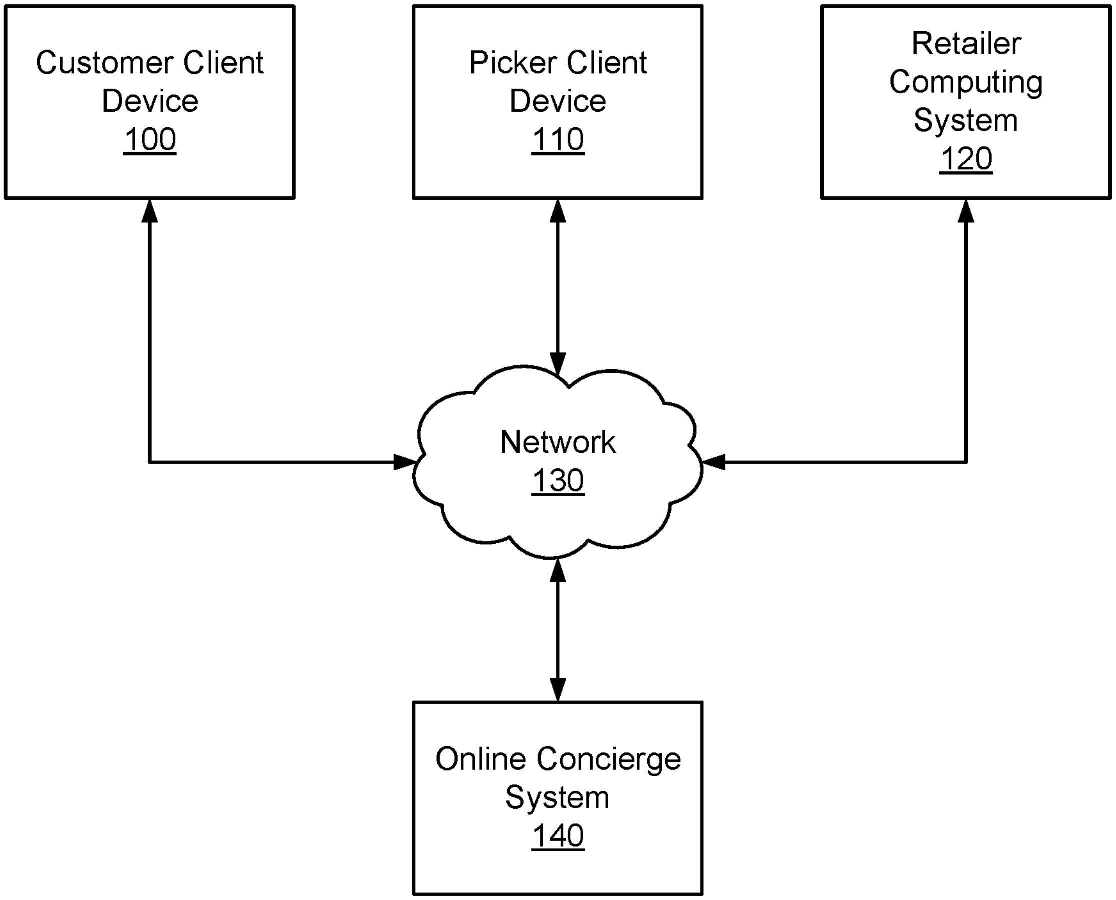
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
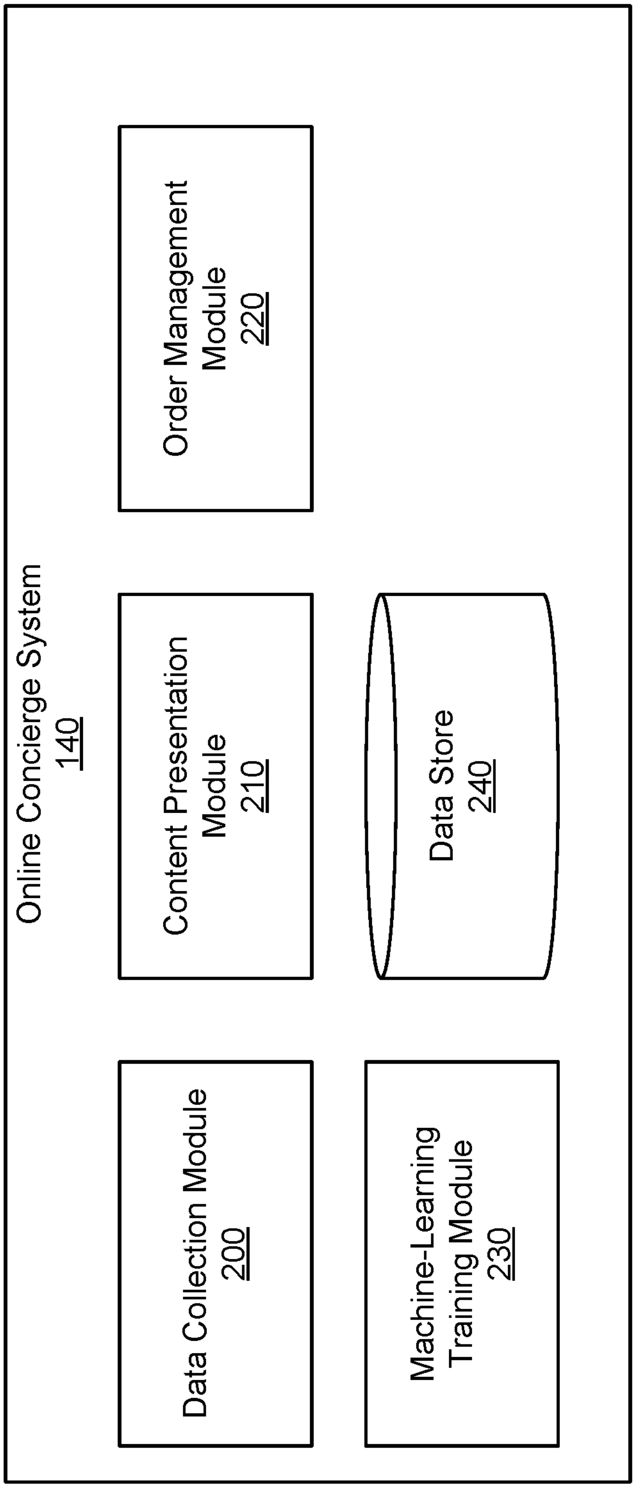
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 obtains a training dataset for a model from searches for items previously received by the content presentation module 210. For example, the machine learning training module 230 retrieves previously received queries and items displayed by the interface module 210 in response to the queries. From the retrieved queries and items displayed in response to the queries, the machine learning training module 230 obtains a training dataset for a model that determines a measure of relevance between a query and an item. The training dataset includes training examples, with each training example including a query and an item. Additionally, each training example includes a label indicating whether a user preformed a specific interaction with the item after the online concierge system 140 received the query. For example, the specific interaction is including the item in an order, while other specific interactions may be identified in other embodiments.

As the data describing prior queries and items generally includes positive training examples where a label applied to a combination of an item and a query indicates the user performed the specific interaction with the item after the online concierge system 140 received the query, the machine learning training module 230 generates negative training examples to improve the accuracy of the model in various embodiments. A negative training example is a training example where a label applied to a combination of a query and an item indicates the user did not perform the specific interaction with the item after the online concierge system 140 receives the query. As further described below in conjunction with FIGS. 3 and 4, in various embodiments, the machine learning module 230 generates negative training examples from positive training examples in the training dataset. For example, the machine learning training module 230 leverages positive training examples for other queries to generate negative training examples for a specific query. For example, items included in positive training examples for other queries are combined with the specific query to generate negative training examples for the specific query, as further described below in conjunction with FIGS. 3 and 4. Further, in some embodiments, the machine learning training module 230 selects a set of the negative training examples for a query to reduce a number of negative samples used when training the model, as further described below in conjunction with FIGS. 3 and 4.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
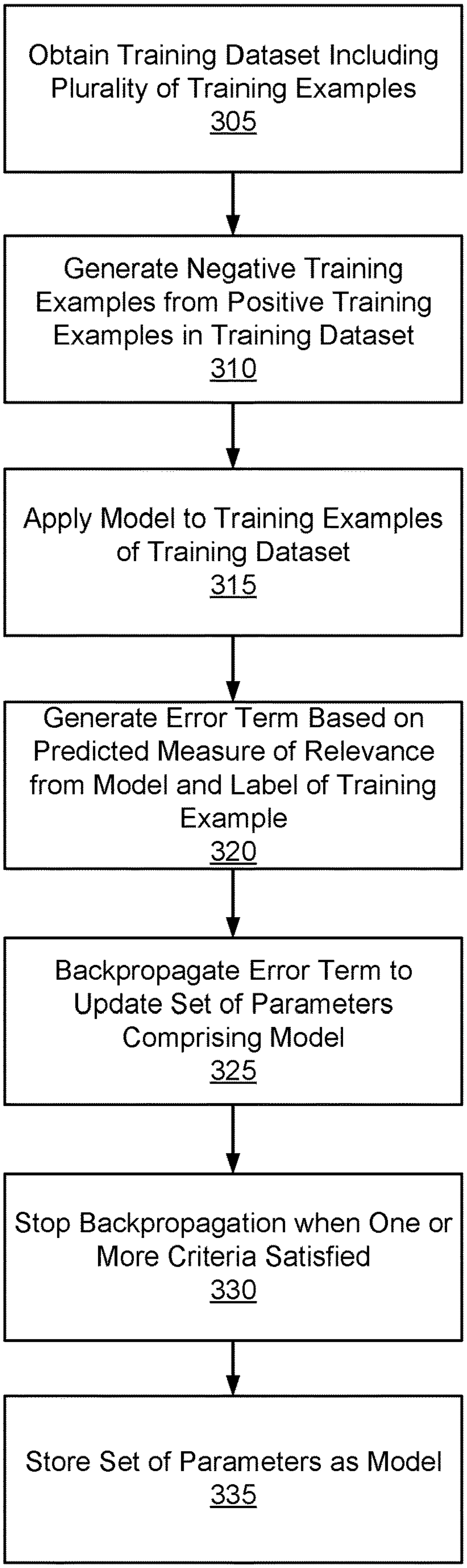
FIG. 3 is a flowchart of a method for training a model to determine a measure of relevance between a query and items, in accordance with one or more embodiments.

FIG. 3 is a flowchart for a method for training a model to determine a measure of relevance between a query and items, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140); however, in other embodiments, the steps described in conjunction with FIG. 3 may be performed by another online system (e.g., a search system, a social network system, etc.). Additionally, each of these steps may be performed automatically by the online concierge system 140 without human intervention.

An online system, such as the online concierge system 140, obtains 305 a training dataset including a plurality of training examples. In various embodiments, the training examples are obtained 305 from queries for items that the online concierge system 140 previously received from users, such as customers. Each training example includes a query and an item. A label is applied to each example indicating whether the user performed a specific interaction with the item of the training example after the online system received the query of the training example. For example, a label applied to a training example indicates whether a user included the item of the training example in an order after the online system received the query included in the training example. Other examples of specific interactions include the user storing the item or the user requesting additional information about the item. A training example with a label indicating that the specific interaction was performed may be referred to herein as a "positive training example," while a training example with a label indicating that the specific interaction was not performed may be referred to herein as "a negative training example." The training dataset includes both positive training examples and negative training examples.

In various embodiments, the query included in a training example comprises one or more terms. The terms may comprise a query sentence including textual data describing information related to an object (e.g., an item) that the query sentence targets for searching. Further, a training example includes one or more attributes of an item in various embodiments. Example attributes of an item include a name of the item, a brand of the item, a size of the item, a unit of the item, a category of the item, a description of the item, or other information describing the item. In some embodiments, an item is a product, good, or service offered by an online concierge system 140 or other online system, while in other embodiments, an item is a content item such as an article, a web page, an application, or other content for presentation to a user. Hence, in various embodiments, a training example includes a combination of a query sentence and attributes of an item, with a label applied to the training example indicating whether a specific interaction was performed with the item corresponding to the attributes after the online system received a query corresponding to the query sentence.

However, previously received queries and interactions by users with items after providing the queries provide positive training examples. To improve accuracy of a model trained using the training dataset, the online system generates 310 negative training examples for the training dataset through one or more methods. For example, the online system generates 310 negative training examples using an in-batch negative method where the online system identifies a specific query and identifies a positive training example including the specific query and an item. The online system generates 310 negative training examples from positive training examples of other queries, so a negative training example for the specific query includes the specific query and an item included in a positive training example for a different query. Thus, the online system leverages positive training examples for other queries to generate 310 negative training examples for the specific query, with the positive training examples for other queries providing items included in negative training examples for the specific query. A label is applied to the negative training example for the specific query indicating the specific interaction was not performed with the item from the positive training example for a different query after the online system received the specific query. This allows the online system to leverage obtained 305 positive training examples to generate 310 negative training examples from the combinations of queries and items comprising positive training examples of the training dataset.

Figure 4:
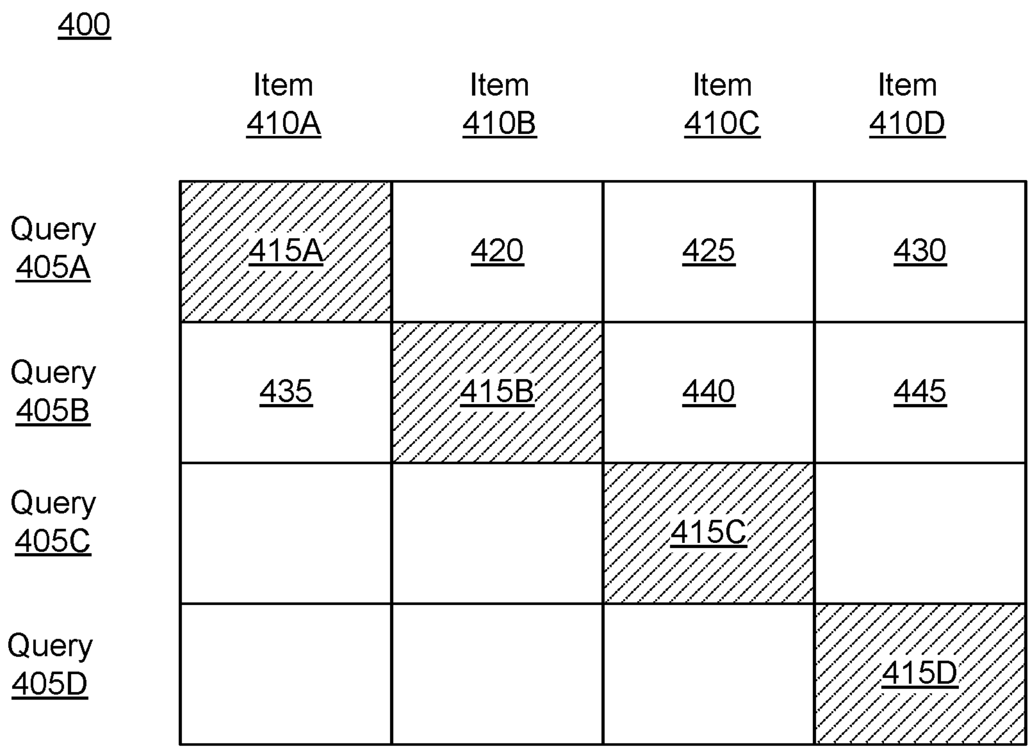
FIG. 4 is an example of generating negative training examples using an in-batch negative method from a training dataset, in accordance with one or more embodiments.

For purposes of illustration, FIG. 4 shows an example generation of negative training examples using an in-batch negative method from a training dataset. FIG. 4 shows an example training dataset 400 comprising training examples including combinations of queries 405A-405D (also referred to individually and collectively using reference number 405) and items 410A-410D (also referred to individually and collectively using reference number 410). Each training example includes a combination of a query 405 and an item 410, with a label applied to a training example indicating whether a user performed a specific interaction with the item 410 after an online system received the query 405. In the example of FIG. 4, the training dataset 400 initially includes positive training examples 415A-415D, with each positive training example 415A-415D including a label indicating the user performed the specific interaction with the item 410 included in a positive training example 415A-415D after providing the query 405 included in the positive training example 415A-415D. In the example of FIG. 4, positive training example 415A includes query 405A and item 410A, positive training example 415B includes query 405B and item 410B, positive training example 415C includes query 405C and item 410C, while positive training example 415D includes query 405D and item 410D.

To more accurately train a model using the training dataset 400, the online system augments the positive training examples 415A-D with negative training examples including a combination of a query 405 and an item 410, as well as a label indicating the user did not perform the specific interaction with the item 410 after providing the query 405 to the online system. In the example of FIG. 4, the online system generates the negative examples via an in-batch negative method by selecting a query 405 included in a positive training example 415A-415D and generating negative training examples that each include the selected query 405 and an item 410 from a positive training example 415A-415D including a different query 405 than the selected query 405. In the example of FIG. 4, the online system selects query 405A and generates negative training example 420 by combining query 405A with item 410B. Similarly, the online system generates negative training example 425 for query 405A as a combination of query 405A and item 410C. Negative training example 430 similarly includes query 405A and item 410D. Hence, positive training examples 415B, 415C, 415D are used to identify items 410B, 410C, 410D for inclusion in negative training examples for query 405A.

FIG. 4 also shows generation of negative training examples for query 405B. In the example of FIG. 4, negative training example 435 includes query 405B and item 410A, while negative training example 440 includes query 405B and item 410C. Similarly, negative training example 445 includes query 405B and item 410D. So, positive training examples 415A, 415C, 415D are used to identify items 410A, 410C, 410D for inclusion in negative training examples for query 405B. Hence, FIG. 4 is an example of an in-batch negative method generating negative training examples for a query 405 from positive training examples 415A-415D for other queries 405, allowing the online system to leverage items 410 included in different positive training examples 415A-415D to generate negative training examples for a query 405 including combinations of the query 405 and items 410 from positive training examples 415A-D for other queries 405.

Referring back to FIG. 3, while generating 310 negative training examples from positive training examples augments the training dataset, such generation of negative training examples causes the training dataset to include more negative training examples than positive training examples. Such a disparity in a number of positive training examples and a number of negative training examples affects accuracy of a model trained using the training dataset. To reduce the number of negative training examples included in the training dataset, the online system selects a subset of the negative training examples generated using the in-batch negative method further described above and discards negative training examples that are not in the subset. In various embodiments, the online system selects the subset of the negative training examples using uniform sampling or self-adversarial reweighting and sampling. For uniform sampling, the online system randomly selects a number of negative training examples including a query from the negative training examples. Each negative training example for a query has the same probability of being selected when universal sampling is performed. In the example of FIG. 4, using uniform sampling to select one negative training example for query 405A causes each of negative training example 420, negative training example 425, and negative training example 430 to have an equal probability of being selected. Uniform sampling allows the online system to augment a positive training example for a query with a subset of negative training examples for the query generated through the in-batch negative method further described above. Such sampling allows the training dataset to include both positive training examples and negative training examples, while maintaining balance between a number of negative training examples and a number of positive training examples in the training dataset.

Although uniform sampling of negative training allows the online system to incorporate a subset of the generated negative training examples into the training dataset, the amount of negative training examples resulting from uniform sampling may cause inefficient training of a model. In various embodiments, the online system mitigates this inefficiency by sampling the negative training examples using self-adversarial negative reweighting. When using self-adversarial negative reweighting for sampling, the online system selects a negative training example based on a measure of similarity between a query and an item included in the negative training example. In various embodiments, the training dataset is used to train a model determining a measure of relevance between an item and a query, so the online system applies the model based on its current parameters to a negative training example, with the measure of relevance output by the current iteration of the model acting as the measure of similarity between the item and the query of the negative training example. Alternatively, the online system determines a measure of similarity between the item and the query of the negative training example as a cosine similarity between the item and the query of the negative training example, as a dot product between the item and the query of the negative training example, or as another metric indicating similarity between the item and the query of the negative training example.

In the example of FIG. 4, using self-adversarial negative reweighting to select one negative training example for query 405A causes, a probability of negative training example 420, negative training example 425, and negative training example 430 to have probabilities of being selected based on a measure of similarity between their respective items 410 and query 405A. A probability of selecting negative training example 420 is based on a measure of similarity between item 410B and query 405A. Similarly, a probability of selecting negative training example 425 is based on a measure of similarity between query 405A and item 410C, while a probability of selecting negative training example 430 is based on a measure of similarity between query 405A and item 410D.

The online system trains a model determining a measure of relevance between an item and a query using the training dataset, which includes positive training examples as well as the negative training examples generated 310 as further described above. In various embodiments, the model includes a query encoder, an item encoder, and a fusion layer. The model comprises a set of weights stored on a non-transitory computer readable storage medium in various embodiments. For training, the online system initializes a network of a plurality of layers comprising the model, with each layer including one or more weights. The model is configured to receive a query and an item and to generate a measure of relevance of the item to the query. The weights comprise a set of parameters used by the desirability model to transform input data—an item and a query—received by the model into output data—a measure of relevance between the item and the query. In various embodiments, the model includes a query encoder and an item encoder configured to generate a query embedding for a query and an item embedding for an item, respectively. A fusion layer included in the model receives the item embedding and the query embedding and determines the measure of relevance based on the item embedding and the query embedding.

Figure 5:
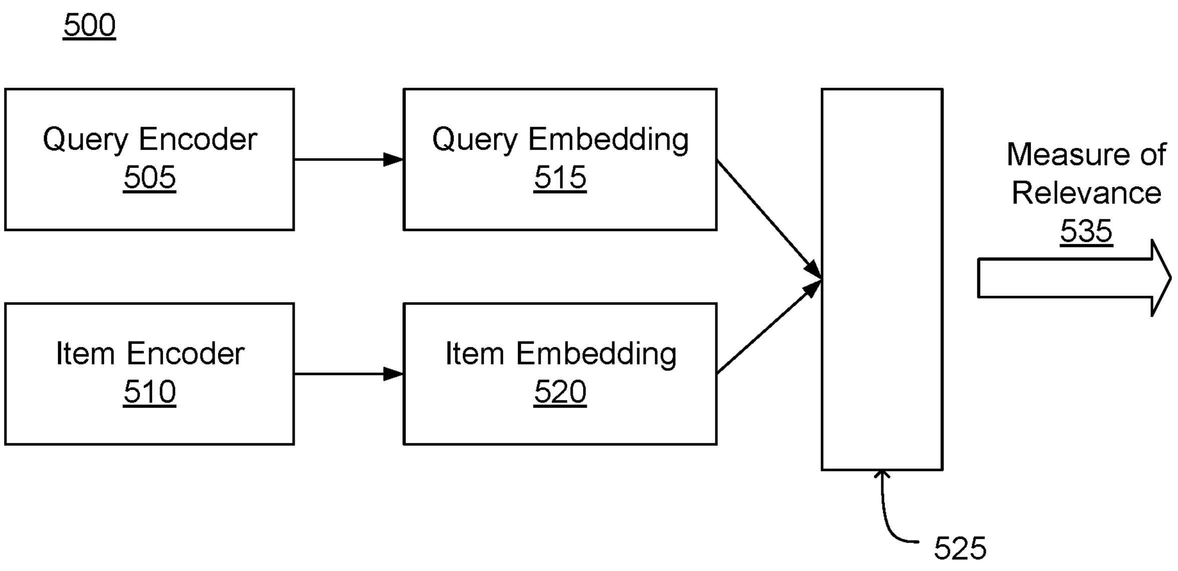
FIG. 5 is an example of a model determining a measure of relevance between an item and a query, in accordance with one or more embodiments.

FIG. 5 shows an example of the model 500 according to one or more embodiments. In the example of FIG. 5, the model 500 includes a query encoder 505 configured to receive a query and to generate a query embedding 515 that represents the query in a multidimensional space. In various embodiments, the query encoder 505 receives sentences or terms comprising a query as input and generates the query embedding 515 corresponding to the received sentences or terms Similarly, the model 500 includes an item encoder 510 configured to receive an item (or attributes of an item) and to generate an item embedding 520 that represents the item in a multidimensional space. Example attributes received by the item encoder 510 include a name of the item, a brand of the item, a size of the item, a category of the item, a description of the item, or other information describing the item. From the attributes for an item, the item encoder 510 generates the item embedding 520 representing the item in the multidimensional space. While FIG. 5 shows an example where the model 500 includes a query encoder 505 and a separate item encoder 510, in other embodiments, the model 500 learns a set of comprehensive embeddings from a combined set of data including both query data and item data rather than having a query encoder 505 and a discrete item encoder 510.

The fusion layer 525 is coupled to the query encoder 505 and to the item encoder 510. The fusion layer 525 receives the query embedding 515 from the query encoder 505 and the item embedding 520 from the item encoder 510 as inputs. The fusion layer 525 determines a measure of relevance 530 between the query embedding 515 and the item embedding 520. In various embodiments the item embedding and the query embedding each have a common number of dimensions in the multidimensional space, and the fusion layer 525 determines a cosine similarity between the query embedding 515 and the item embedding 520 as the measure of relevance 535. As another example, the fusion layer 525 determines the measure of relevance 535 as a dot product between the query embedding 515 and the item embedding 520. While in other embodiments, the fusion layer 525 determines the measure of relevance 535 between the query and the item as another measure of similarity between the corresponding query embedding and item embedding.

Referring back to FIG. 3, the online system generates the weights for the model through training, where the model is applied 315 to training examples from the training dataset after the set of weights comprising the model are first initialized. As further described above, each training example includes a query and an item, with a label applied to the training example indicating whether a user performed a specific interaction with the item after the online system received the query. Application of the model to a training example generates a predicted measure of relevance between an item and a query included in the training example.

For each training example of the training dataset to which the model is applied 315, the online system generates 320 an error term based on a predicted measure of relevance between the item and the query included in the training example and a label associated with the training example. The error term is larger when a difference between the predicted measure of relevance and the label applied to the training example is larger and is smaller when the difference between the predicted measure of relevance and the label applied to the training example is smaller. In various embodiments, the online system generates 320 the error term between the predicted measure of relevance and the label applied to the training example using a loss function. Example loss functions include a mean square error function, a mean absolute error, a hinge loss function, and a cross-entropy loss function.

In various embodiments, the online system applies a weight to the difference between the predicted measure of relevance from the loss function and the label applied to the training example when generating the error term. The weight is directly related to a measure of similarity between the item of the training example and the query of the training example. For example, the weight is the measure of similarity between the training example and the query of the training examples. In some embodiments, the measure of similarity is the measure of relevance between the item and the query of the training example based on a current set of parameters comprising the model. Alternatively, the measure of similarity is a cosine similarity of the item of the training example and the query of the training example, a dot product of the item of the training example and the query of the training example, or another value based on the item of the training example and the query of the training example. Applying the weight based on the measure of similarity between the item of the training example and the query of the training example to the difference between the predicted measure of relevance and the label applied to the training example allows the online system to increase error terms for training examples with an item and a query having higher measures of similarity, allowing such training examples to have a greater effect on the weights comprising the model. In various embodiments, the error term has a positive value if the difference between the predicted measure of relevance and the label applied to the training example is greater than a threshold value and has a negative value if the difference between the predicted measure of relevance and the label applied to the training example is less than the threshold value.

The online concierge system 140 backpropagates 325 the error term to update the set of parameters comprising the model and stops 330 backpropagation in response to the error term, or the loss function, satisfying one or more criteria. For example, the online concierge system 140 backpropagates 325 the error term through the model to update parameters of the model until the error term has less than a threshold value. For example, the online system 140 may apply gradient descent to update the set of parameters. The online system stores 335 the set of parameters comprising the model on a non-transitory computer readable storage medium after stopping 330 the backpropagation for subsequent use of the model to determine a measure of relevance between an item and a query. For example, the online system applies the trained model to a received query and items retrieved in response to the received query and ranks the items based on their measures of relevance to the query determined by the trained model. In the preceding example, the model allows the online system to rank items so items having higher measures of relevance to the query are initially displayed.

As an alternative to, or in addition to, weighting a difference between the predicted measure of relevance from the loss function and the label applied to the training example, when using self-adversarial negative sampling, the online system selects the subset of negative training examples for training the model based on measures of similarity between items and queries in negative training examples. For example, the online system selects the subset of negative training examples based on a probability distribution, where a probability of selecting a negative training example is based on a measure of similarity between an item included in the negative training example and a query included in the negative training example. In various embodiments, the probability distribution determined based on the measures of similarity may be adjusted by modifying a temperature parameter that affects the confidence of the probabilities (e.g., a temperature less than a threshold increases probabilities determined for negative training examples, while the temperature greater than the threshold decreases probabilities determined for negative training examples). In various embodiments, the online system selects the subset of negative training examples as negative training examples having at least a threshold probability of selection, with the probability of selection based on a measure of similarity between an item included in the negative training example and a query included in the negative training example. The measure of similarity between the item and the query of a negative training example may be an output of a current set of parameters comprising the model applied to the item and the query of the negative training example. Alternatively, the measure of similarity is a cosine similarity between the query and the item of the negative training example or is a dot product of the query and the item of the negative training example. However, other methods may be used to determine the measure of similarity between the item and the query of the negative training example in other embodiments.

Further, the online system may leverage negative-sample sharing for the training dataset by employing a joint negative sample dataset. For the joint negative sample dataset, queries in the training dataset are grouped into sets having a specific size, with a common group of negative training examples used for each query in a set. In some embodiments, for a query in a set, items included in positive training examples for other queries in the set are used as negative training examples for the query, as further described above in conjunction with FIGS. 3 and 4. Hence, rather than independently sampling a number of negative training examples for each query, the online system groups queries into sets and determines a group of negative training examples used for each set. The online system determines a group of negative training examples for a query of a set based on positive training examples for other queries in the set (as further described above), with the group of negative training examples shared across queries of the set. Thus, the group of negative training examples is used for multiple queries in a set. In some embodiments, when training the model, the online system increases a weight applied to a difference between a label associated with a negative training example and a predicted measure of relevance determined for the item of the negative training example and the query of the negative training example, allowing the group of negative training examples to indirectly model a larger number of negative training examples. In various embodiments, the weight applied when determining error terms for negative training examples and a number of queries in a set are hyperparameters that the online system modifies to optimize training of the model.

Sharing negative training examples across a set of queries may reduce a total number of negative training examples used, increasing computational efficiency. Additionally, such negative-sample sharing may further reduce computational cost by leveraging matrix-to-matrix multiplication for determining measures of relevance when training the model from the grouping of queries into sets. Further, without an overly large number of negative samples, sharing of negative training examples the accuracy of the model is improved by avoiding issues observed with training that uses a large number of negative examples, such as generalization due to diversity in a large set of negative samples.

ADDITIONAL CONSIDERATIONS

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method for generating a query-item relevance model, the method comprising:

obtaining a training dataset that comprises a plurality of training examples, wherein each of the plurality of training examples is either a positive training example or a negative training example, and wherein each of the plurality of training examples comprises:

a query comprising one or more terms, and item data describing one or more attributes of an item;

adding a label to each of the plurality of training examples, wherein:

the label for a positive training example indicates that a specific interaction was performed with the item after the query was received, and the label for a negative training example indicates that a specific interaction was not performed with the item after the query was received, the label further weighted by a measure of similarity between the item of the training example and the query of the training example; and accessing a machine learning model comprising a network of a plurality of layers, the machine learning model configured to receive an input query and an input item and to generate a measure of relevance of the input item to the input query;

for each training example of the plurality of training examples of the training dataset:

applying the machine learning model to the query of the training example and to the item of the training example, wherein the machine learning model outputs a measure of relevance based thereon, generating an error term based on a difference between the measure of relevance output from the machine learning model and the label of the training example, and backpropagating the error term to update a set of parameters of the machine learning model; and storing the set of parameters on a non-transitory computer readable storage medium as trained parameters of the query-item relevance model.

2. The method of claim 1, wherein the measure of similarity between the item of the training example and the query of the training example comprises the measure of relevance between the item of the training example and the query of the training example using the stored set of parameters for the machine learning model.

3. The method of claim 1, wherein the measure of similarity between the item of the item of the training example and the query of the query of the training example comprises a cosine similarity between the item of the training example and the query of the training example.

4. The method of claim 1, wherein labeling each of the plurality of training examples comprises:

determining the measure of similarity between the item of the training example and the query of the training example, for each negative training example, by comparing an item embedding of the item of the training example and a query embedding of the query of the training example.

5. The method of claim 1, wherein obtaining the training dataset further comprises:

selecting a subset of the generated one or more negative training examples for the query.

6. The method of claim 5, wherein selecting the subset of the generated one or more negative training examples for the query comprises:

selecting negative training examples from the generated one or more negative training examples based on a measure of similarity between the query and an item included in a negative training example.

7. The method of claim 6, wherein the measure of similarity between the query and the item included in the negative training example comprises the measure of relevance between the item of the negative training example and the query using the stored set of parameters for the machine learning model.

8. The method of claim 6, wherein the measure of similarity between the query and the item included in the negative training example comprises a cosine similarity between the item of the negative training example and the query.

9. The method of claim 5, wherein selecting the subset of the generated one or more negative training examples for the query comprises:

selecting negative training examples based on a probability distribution where a probability of selecting a negative training example is based on a measure of similarity between an item included in the negative training example and the query.

10. The method of claim 1, wherein the network of the plurality of layers comprises a query encoder configured to generate a query embedding for the query of the training example, an item encoder configured to generate an item embedding for the item of the training example, and a fusion layer configured to generate the measure of relevance from the query embedding and the item embedding.

11. A product comprising a query-item relevance model stored on a non-transitory computer readable storage medium, wherein the query-item relevance model is manufactured by a process comprising:

obtaining a training dataset that comprises a plurality of training examples, wherein each of the plurality of training examples is either a positive training example or a negative training example, and wherein each of the plurality of training examples comprises:

a query comprising one or more terms, and item data describing one or more attributes of an item;

adding a label to each of the plurality of training examples, wherein:

the label for a positive training example indicates that a specific interaction was performed with the item after the query was received, and the label for a negative training example indicates that a specific interaction was not performed with the item after the query was received, the label further weighted by a measure of similarity between the item of the training example and the query of the training example; and accessing a machine learning model comprising a network of a plurality of layers, the machine learning model configured to receive an input query and an input item and to generate a measure of relevance of the input item to the input query;

for each training example of the plurality of training examples of the training dataset:

applying the machine learning model to the query of the training example and to the item of the training example, wherein the machine learning model outputs a measure of relevance based thereon, generating an error term based on a difference between the measure of relevance output from the machine learning model and the label of the training example, and backpropagating the error term to update a set of parameters of the machine learning model; and storing the set of parameters on a non-transitory computer readable storage medium as trained parameters of the query-item relevance model.

12. The product of claim 11, wherein the measure of similarity between the item of the training example and the query of the training example comprises the measure of relevance between the item of the training example and the query of the training example using the stored set of parameters for the machine learning model.

13. The product of claim 11, wherein the measure of similarity between the item of the training example and the query of the training example comprises a cosine similarity between the item of the training example and the query of the training example.

14. The product of claim 11, wherein labeling each of the plurality of training examples comprises:

determining the measure of similarity between the item of the training example and the query of the training example, for each negative training example, by comparing an item embedding of the item of the training example and a query embedding of the query of the training example.

15. The product of claim 14, wherein obtaining the training dataset further comprises:

selecting a subset of the generated one or more negative training examples for the query.

16. The product of claim 15, wherein selecting the subset of the generated one or more negative training examples for the query comprises:

selecting negative training examples from the generated one or more negative training examples based on a measure of similarity between the query and an item included in a negative training example.

17. The product of claim 15, wherein selecting the subset of the generated one or more negative training examples for the query comprises:

selecting negative training examples based on a probability distribution where a probability of selecting a negative training example is based on a measure of similarity between an item included in the negative training example and the query.

18. A system for generating a query-item relevance model, the system comprising:

one or more processors; and a non-transitory computer readable storage medium having instructions encoded thereon that, when executed by the one or more processors, cause the one or more processors to perform steps comprising:

obtaining a training dataset that comprises a plurality of training examples, wherein each of the plurality of training examples is either a positive training example or a negative training example, and wherein each of the plurality of training examples comprises:

a query comprising one or more terms, and item data describing one or more attributes of an item;

adding a label to each of the plurality of training examples, wherein:

the label for a positive training example indicates that a specific interaction was performed with the item after the query was received, and the label for a negative training example indicates that a specific interaction was not performed with the item after the query was received, the label further weighted by a measure of similarity between the item of the training example and the query of the training example; and accessing a machine learning model comprising a network of a plurality of layers, the machine learning model configured to receive an input query and an input item and to generate a measure of relevance of the input item to the input query;

for each training example of the plurality of training examples of the training dataset:

applying the machine learning model to the query of the training example and to the item of the training example, wherein the machine learning model outputs a measure of relevance based thereon, generating an error term based on a difference between the measure of relevance output from the machine learning model and the label of the training example, and backpropagating the error term to update a set of parameters of the machine learning model; and storing the set of parameters on a non-transitory computer readable storage medium as trained parameters of the query-item relevance model.

19. The system of claim 18, wherein the measure of similarity between the item of the training example and the query of the training example comprises the measure of relevance between the item of the training example and the query of the training example using the stored set of parameters for the machine learning model.

20. The system of claim 18, wherein labeling each of the plurality of training examples comprises:

determining the measure of similarity between the item of the training example and the query of the training example, for each negative training example, by comparing an item embedding of the item of the training example and a query embedding of the query of the training example.

* * * * *